UNITED STATES PATENT OFFICE.

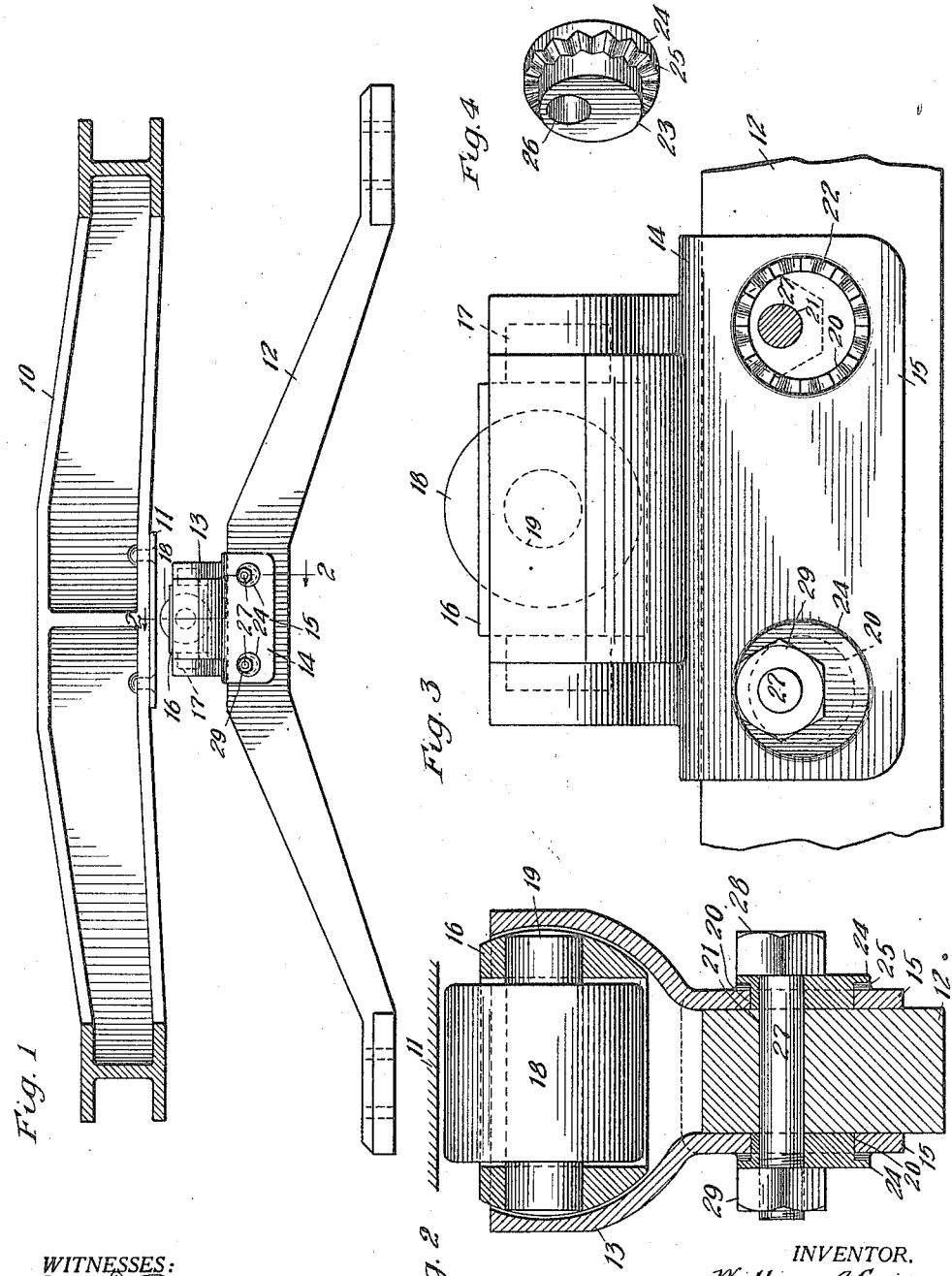

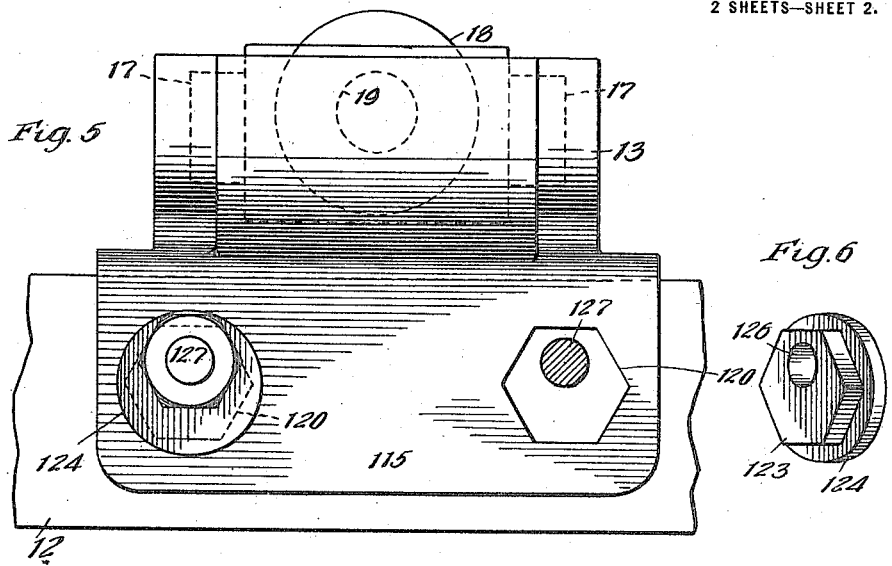

WILLIAM A. GEIGER, OF CHICAGO, ILLINOIS, ASSIGNOR TO WILLIAM H. MINER, OF CHAZY, NEW YORK.

ADJUSTABLE SIDE BEARING.

1,180,488.

Specification of Letters Patent.

Patented Apr. 25, 1916.

Application filed February 6, 1915. Serial No. 6,485.

*To all whom it may concern:*

Be it known that I, WILLIAM A. GEIGER, a citizen of the United States, residing at Chicago, in the county of Cook and State of Illinois, have invented a certain new and useful Improvement in Adjustable Side Bearings, of which the following is a full, clear, concise, and exact description, reference being had to the accompanying drawings, forming a part of this specification.

This invention relates to improvements in adjustable side bearings.

An object of the invention is to provide an adjustable side bearing for railway cars of simple and efficient construction, comprising few parts and providing for a wide variety of fine adjustments.

The invention furthermore consists in the improvements in the parts and devices and in the novel combinations of the parts and devices, as herein shown, described or claimed.

In the drawing forming a part of this specification, Figure 1 is a side elevation of a portion of a passenger car underframe and side bearing bridge of a truck showing my improvements in connection therewith. Fig. 2 is an enlarged vertical sectional view taken substantially on the line 2—2 of Fig. 1. Fig. 3 is an enlarged side elevation of the adjustable side bearing proper, one of the adjusting eccentrics being removed and Fig. 4 is a detail perspective of one of the adjusting eccentrics. Figs. 5 and 6 are views corresponding respectively with Figs. 3 and 4 and showing a different embodiment of my invention and Figs. 7 and 8 are views corresponding with Figs. 3 and 4 and 5 and 6 and illustrating another form of my invention.

In said drawing, and referring to Figs. 1 to 4 inclusive, 10 denotes a portion of a passenger car under-frame having a wear plate 11 secured thereto; 12 denotes a side bearing bridge of a six wheel passenger car truck; and 13 denotes a roller bearing attached to said bearing bridge. The roller bearing 13 may be of any desired or well known form and, as shown, comprises a base casting 14 having side flanges 15 straddling the inner and outer faces of the bearing bridge 12; a cradle 16 rockably mounted in said casting on trunnions 17; and an antifriction roller 18 rotatably mounted in said cradle 16 on an axle 19. The means for adjusting the bearing comprise the following: As shown, each of the depending side flanges 15 is provided with a pair of circular recesses or perforations 20 located opposite the usual bolt or rivet holes 21 in the side bearing bridge. On their outer faces, each of the flanges 15 is provided with a circular series of notches or ratchet teeth 22 surrounding each circular perforation 20 (see Fig. 3). Fitting within each of the circular recesses 20, is an eccentric adjusting block 23 having a circumferential flange 24 at its outer end and the inner face of which is provided with a circularly arranged series of ratchet teeth or notches 25 corresponding in size and shape to the teeth 22. Each of said adjusting blocks is perforated as indicated at 26 to receive a bolt 27 therethrough. Each of the bolts 27 is provided with a head 28 and nut 29. In Figs. 1, 2 and 3, the roller bearing is shown in its lowermost position but to adjust it to any point within the limits provided for, the bolts 27 are loosened or taken out entirely and the eccentric adjusting blocks 23 rotated within their corresponding holes 20 in the flanges 15 to the desired amount, it being understood that the teeth 25 are disengaged from the teeth during this operation. After the required adjustment has been made, the adjusting eccentric blocks 23 are then pressed home and the teeth 25 and 22 brought into engagement after which the bolts 27 are tightened and the parts all locked in position. By having the teeth of the adjusting blocks securely locked in engagement with the teeth on the depending flanges of the bearing base casting, slippage or giving away of the parts is thus prevented and if desired, and this will be preferable in actual service, shims or plates may be interposed between the base casting 14 and the upper surface of the side bearing bridge when the bearing is adjusted anywhere above its lowermost position and thus relieve the pressure on the bolts 27 and the locking blocks.

In the construction shown in Figs. 5 and 6, the depending side flanges 115 of the side bearing base casting are shown as provided with hexagonal openings 120 instead of the circular openings 20 shown in the device illustrated in Figs. 1 to 4. In accordance with the hexagonal openings 120, adjusting blocks 123 are provided of hexagonal shape arranged to fit the openings 120, said blocks 123 being provided with a circumferential flange 124. Each of these blocks 123 is also eccentrically recessed or perforated as indicated at 126 to receive the bolts 127 therethrough. The adjustment is made in this construction by rotating the blocks 123 and inserting them in the proper position in the openings 120 as will be understood from the preceding description of the construction shown in Figs. 1 to 4.

In the arrangement shown in Figs. 7 and 8, the depending side flanges of the roller bearing base casting are provided with elongated vertically extending slots 30 and along the side thereof, on the outer face of the flanges are arranged series of teeth 31 with which are adapted to coöperate corresponding teeth 32 formed on the inner side of an adjusting locking block 33 perforated as at 34 to receive the bolts 35 therethrough. As will be understood, the adjustment of the bearing is made by loosening the adjusting blocks 33 and raising the roller bearing to the desired height and then clamping the adjusting blocks in position by tightening the bolts, shims or plates being used if desired to relieve the strain on the bolts.

Although I have herein shown and described what I now consider the best means of carrying out my invention, yet it will be understood that changes and modifications may be made in the details and arrangements of the parts without departing from the spirit of the invention and all such changes and modifications are contemplated as come within the scope of the claims appended hereto.

I claim:—

1. In an adjustable side bearing, the combination with a side bearing member, of eccentric elements coöperable with said member and adapted to be attached to a portion of a car, and means for locking said elements with said member in any adjusted position.

2. In an adjustable side bearing, the combination with a side bearing member having flanges by which it is adapted to be secured to a portion of the car, said flanges having openings therein, of adjustable elements corresponding in shape and size to said openings arranged to fit therewithin and rotatable about an eccentric axis, and means for locking said elements in any adjusted position in said openings.

3. In a side bearing of the character described, the combination with a side bearing member having attaching flanges, said flanges being provided with openings therein, of adjusting blocks corresponding in shape and size to said openings and arranged to be placed therein in various positions, interengaging locking devices on said flanges and said blocks, and means for eccentrically mounting said blocks.

4. In a side bearing for railway cars, the combination with a base casting having an antifriction roller rockably mounted therein, said casting having depending side flanges adapted to straddle a side bearing bridge of a passenger car truck, said flanges being provided with openings therein, of adjusting blocks corresponding in size and shape to said openings and adapted to assume various positions therein, said blocks being eccentrically perforated to receive bolts therethrough, and bolts extending through said blocks and arranged to hold the same in adjusted positions on a side bearing bridge.

5. In a side bearing for railway cars, the combination with a base casting having an anti-friction roller rockably mounted therein, said casting having depending side flanges adapted to straddle a side bearing bridge of a passenger car truck, said flanges being provided with openings therein, of adjusting blocks corresponding in size and shape to said openings and adapted to assume various positions therein, said blocks being eccentrically perforated to receive bolts therethrough, and bolts extending through said blocks and arranged to hold the same in adjusted positions on a side bearing bridge, and interengaging teeth on said adjusting members and said flanges adapted to hold the parts locked in adjusted position.

6. In a side bearing for railway cars, the combination with a casting having flanges arranged to straddle a side bearing bridge, each of said flanges being provided with openings, of adjusting blocks, one for each of said openings and corresponding in size and shape thereto and arranged to fit therein, said blocks being adjustable to various positions in said openings, each of said blocks having a circumferential outer flange overlapping said flanges of the side bearing casting, said blocks being eccentrically perforated to receive attaching bolts therethrough, and interengaging locking means on said circumferential flanges and the flanges of said casting.

7. In a side bearing for railway cars, the combination with a casting having flanges arranged to straddle a side bearing bridge, each of said flanges being provided with an opening, of adjusting blocks, the number of blocks corresponding to the number of said openings, said blocks and flanges being relatively adjustable, each of said blocks having a series of notches on its inner face and said flanges having series of notches on their outer faces adjacent each of said openings and coöperable with said notches on the blocks, each of said blocks being perforated to receive an attaching bolt therethrough.

WILLIAM A. GEIGER.

Witnesses:
CARRIE G. RANZ,
LUCILLE HIGGINS.

Copies of this patent may be obtained for five cents each, by addressing the "Commissioner of Patents, Washington, D. C."